(12) United States Patent
Coxon et al.

(10) Patent No.: US 11,135,789 B2
(45) Date of Patent: Oct. 5, 2021

(54) METHODS AND DEVICES OF FORMING A TENSIONED STRINGER FOR A VEHICLE

(71) Applicant: The Boeing Company, Chicago, IL (US)

(72) Inventors: Brad Andrew Coxon, Everett, WA (US); Daniel Rotter, Lake Forest Park, WA (US)

(73) Assignee: THE BOEING COMPANY, Chicago, IL (US)

( * ) Notice: Subject to any disclaimer, the term of this patent is extended or adjusted under 35 U.S.C. 154(b) by 668 days.

(21) Appl. No.: 15/963,464

(22) Filed: Apr. 26, 2018

(65) Prior Publication Data

US 2019/0329509 A1    Oct. 31, 2019

(51) Int. Cl.
| | |
|---|---|
| *B29C 70/56* | (2006.01) |
| *B29C 53/04* | (2006.01) |
| *B29K 105/00* | (2006.01) |
| *B29L 31/30* | (2006.01) |

(52) U.S. Cl.
CPC ............. *B29C 70/56* (2013.01); *B29C 53/04* (2013.01); *B29K 2105/256* (2013.01); *B29L 2031/3076* (2013.01)

(58) Field of Classification Search
CPC ......... B29C 70/56; B29C 53/04; B64C 1/064; B64C 3/182; B29L 2031/3076; B29K 2105/256
USPC ........................................................ 264/229
See application file for complete search history.

(56) References Cited

U.S. PATENT DOCUMENTS

| | | |
|---|---|---|
| 2,693,011 A | 11/1954 | Fernberg |
| 6,306,239 B1 | 10/2001 | Breuer et al. |
| 6,495,086 B1 | 12/2002 | Uytterhaeghe et al. |
| 8,465,613 B2 | 6/2013 | Rotter et al. |
| 8,551,382 B2 | 10/2013 | Anderson et al. |
| 8,557,165 B2 | 10/2013 | Jones et al. |
| 8,601,694 B2 | 12/2013 | Brennan et al. |
| 9,162,380 B2 | 10/2015 | Jones et al. |
| 9,162,396 B2 | 10/2015 | Coxon et al. |
| 9,254,619 B2 | 2/2016 | Rotter et al. |
| 9,387,627 B2 | 7/2016 | Brennan et al. |

(Continued)

FOREIGN PATENT DOCUMENTS

| | | |
|---|---|---|
| EP | 2508326 A1 | 10/2012 |
| EP | 2561979 A2 | 2/2013 |

(Continued)

OTHER PUBLICATIONS

European Search Report dated Oct. 9, 2019 in re EP Application No. 19157346.8.

(Continued)

*Primary Examiner* — Matthew J Daniels
*Assistant Examiner* — Yunju Kim
(74) *Attorney, Agent, or Firm* — Coats & Bennett, PLLC

(57) ABSTRACT

Methods and devices of fabricating a stringer for a vehicle. The stringer can be constructed from two charges that are formed together into the stringer. During fabrication, the charges are placed over support members with the ends of each charge extending over a die cavity. The charges are secured and a punch die forces the first ends into the die cavity forming blades of the stringer. The charges are secured thus tensioning the charges during the punch process.

20 Claims, 15 Drawing Sheets

(56) References Cited

U.S. PATENT DOCUMENTS

| | | |
|---|---|---|
| 9,387,628 B2 | 7/2016 | Chapman et al. |
| 9,561,602 B2 | 2/2017 | Jones et al. |
| 2004/0265536 A1 | 12/2004 | Sana et al. |
| 2009/0148647 A1* | 6/2009 | Jones ................... B64F 5/10 428/58 |
| 2009/0320995 A1 | 12/2009 | Menendez Martin et al. |
| 2013/0174396 A1 | 7/2013 | Torres Martinez |
| 2014/0103585 A1 | 4/2014 | Coxon et al. |
| 2015/0174831 A1 | 6/2015 | Miguez Charines et al. |
| 2015/0183503 A1 | 7/2015 | Miguez Charines et al. |
| 2017/0008217 A1 | 1/2017 | Chapman et al. |
| 2018/0093431 A1 | 4/2018 | Forston et al. |
| 2019/0329508 A1 | 10/2019 | Shinozaki |
| 2019/0329856 A1 | 10/2019 | Shinozaki |

FOREIGN PATENT DOCUMENTS

| | | |
|---|---|---|
| EP | 2868465 A1 | 5/2015 |
| EP | 2982500 A1 | 2/2016 |
| WO | 2015011316 A1 | 1/2015 |

OTHER PUBLICATIONS

European Search Report dated Nov. 19, 2019 in re EP Application No. 19164961.5.
EP Office Action dated Oct. 14, 2019 in re EP Application No. 19164970.6 filed Mar. 25, 2019.

* cited by examiner

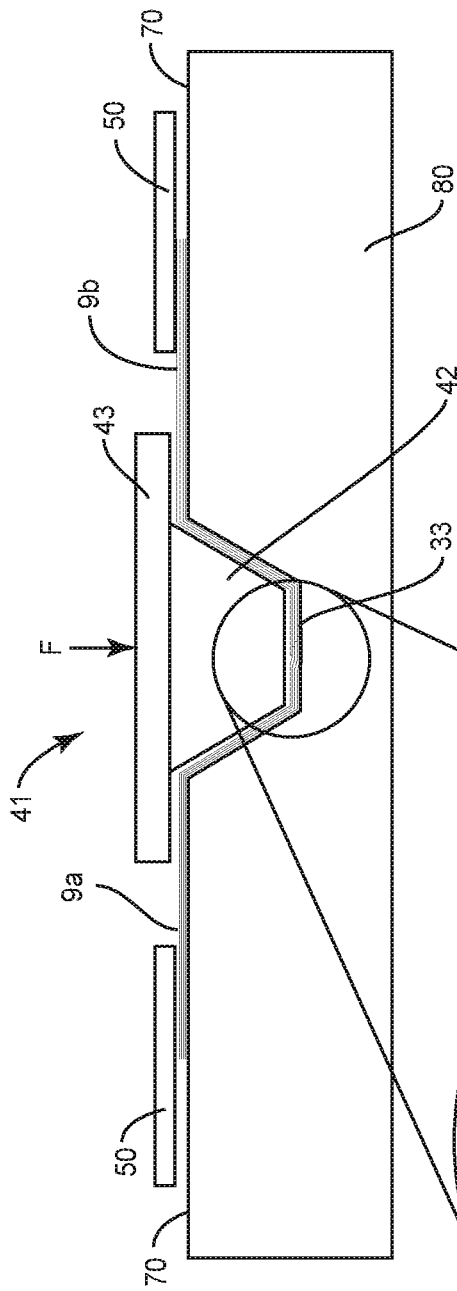
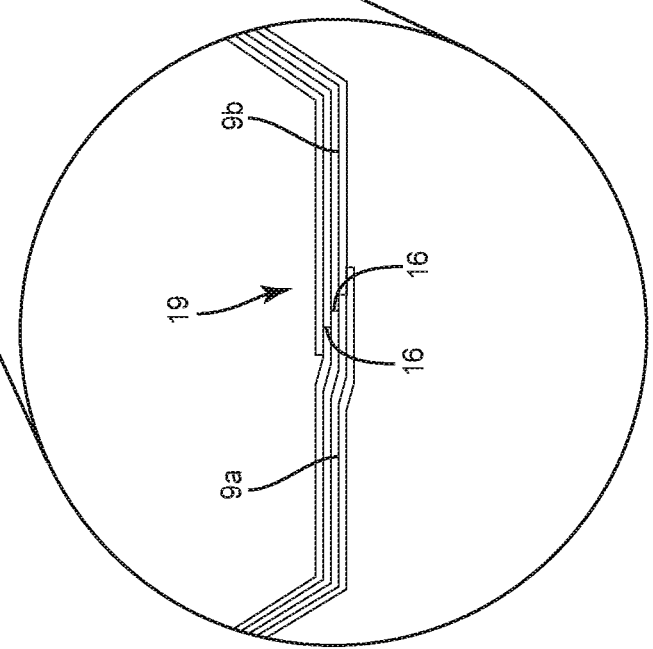
FIG. 14
FIG. 15

METHODS AND DEVICES OF FORMING A TENSIONED STRINGER FOR A VEHICLE

TECHNOLOGICAL FIELD

The present disclosure generally relates to methods and devices for stringer fabrication. More particularly, the present disclosure relates to methods and devices for tensioning first and second charges during the formation of the stringer.

BACKGROUND

Composite reinforcing substructures such as stringers, one example of which is referred to as blade stiffeners, are frequently used in various vehicles in the marine and aircraft industries. The stringers may be constructed from a single flat laminate. Existing forming methods for forming blade stringers from a single flat laminate include positioning the single flat laminate over a die cavity. A central section of the laminate extends over the die cavity with outer edges being positioned away from the die cavity. A punch die moves downward and forces the laminate into the die cavity. The section of the laminate that is moved into the die cavity forms a first section of the stringer. The sections at the ends of the laminate that remain out of the die cavity form a second section of the stringer.

This existing punching process has several limitations. The single laminate design does not allow for the different, facing sides of the stringer to move independently during formation. This can result in anomalies to be created in the blade stiffener during certain punch forming configurations. Using a single laminate charge can also restrict the ability to create localized geometrical features on each of the different sides of the stringer within that one charge. Further, the first section of the laminate that is forced into the die cavity is in tension. However, the second sections of the laminate that remain out of the die cavity are not in tension.

SUMMARY

One aspect is directed to a method of fabricating a composite stringer for a vehicle. The method includes positioning first and second charges at a die cavity with first ends of each of the first and second charges extending over the die cavity. The method also includes securing second ends of each of the first and second charges away from the die cavity. The method includes inserting a punch die into the die cavity and driving the first ends of each of the first and second charges into the die cavity while the second ends remain secured away from the die cavity. The method also includes moving the punch die out of the die cavity.

In another aspect, the method can also include moving first and second form blocks that form the die cavity together and applying lateral force to blades of the first and second charges.

In another aspect, the method can also include releasing the second ends of the first and second charges prior to moving the first and second form blocks together.

In another aspect, securing the second ends of each of the first and second charges away from the die cavity includes compressing the second ends between a holding member and a support member.

In another aspect, the method can also include bending the first and second charges into the die cavity and forming blades in the first and second charges.

In another aspect, the method can also include maintaining a section of each of the first and second charges at the second ends on a support member and forming flanges in the first and second charges.

In another aspect, the method can also include tensioning the first and second charges at different tension levels by driving the punch die into the die cavity.

In another aspect, the method can also include overlapping the first ends of the first and second charges over the die cavity prior to inserting the punch die into the die cavity.

In another aspect, the method can also include inserting the punch die into the die cavity and forming a scarf joint at the first ends of the first and second charges.

One aspect is directed to a method of fabricating a composite stringer for a vehicle that includes positioning first and second charges at a die cavity formed between first and second form blocks with a first section including first ends of each of the first and second charges cantilevered over the die cavity and a second section including second ends of each of the first and second charges supported on support members. The method includes securing the second sections of the first and second charges to the support members. The method includes inserting a punch die into the die cavity and moving the first sections into the die cavity while the second sections remain secured on the support members. The method includes moving the punch die out of the die cavity. The method also includes moving together the first sections of the first and second charges.

In another aspect, the method can also include inflating a first bladder and securing the second section of the first charge to one of the support members and inflating a second bladder and securing the second section of the second charge to a second one of the support members.

In another aspect, the method can also include abutting together first ends of the first and second charges over the die cavity prior to inserting the punch die into the die cavity.

In another aspect, the method can also include overlapping first ends of the first and second charges over the die cavity prior to inserting the punch die into the die cavity.

In another aspect, the method can also include forming a scarf joint at the first ends of the first and second charges.

In another aspect, the method can also include releasing the second sections of the first and second charges after inserting the punch die into the die cavity.

In another aspect, the method can also include tensioning an entire length of each of the first and second charges while inserting the punch die into the die cavity and moving the first sections into the die cavity while the second sections remain secured to the support members.

One aspect is directed to a method of fabricating a composite stringer for a vehicle that includes positioning first and second charges over a die cavity. The method includes positioning a first section of the first charge over the die cavity and securing a second section of the first charge to a first support member. The method includes positioning a first section of the second charge over the die cavity and securing a second section of the second charge to a second support member. The method includes inserting a punch die into the die cavity and driving the first sections of each of the first and second charges into the die cavity while the second sections remain secured to the first and second support members and tensioning the first and second charges. The method includes moving the punch die out of the die cavity.

In another aspect, the method can also include moving together first and second form blocks that are positioned on opposing sides of the die cavity and applying lateral force to the first sections.

One aspect is directed to a wing of a vehicle manufactured according to one of the above methods.

One aspect is directed to a vehicle with a wing manufactured according to one of the above methods.

BRIEF DESCRIPTION OF THE DRAWINGS

FIGS. 13-14 are schematic illustrations of steps of fabricating a composite hat stringer for a vehicle.

FIG. 15 is an illustration of a scarf joint of the stringer of FIG. 14.

DETAILED DESCRIPTION

The present disclosure includes methods and devices of fabricating a stringer for a vehicle. The stringer can be constructed from two charges that are formed together into the stringer. During fabrication, the separate charges are each positioned with a first section placed over a die cavity and a second section positioned away from the die cavity. The second sections of the charges are secured. A punch die forces the first sections into the die cavity forming a first section of the stringer. The second sections are secured away from the die cavity during the punching process thus tensioning the charges along their lengths.

Figure 1:
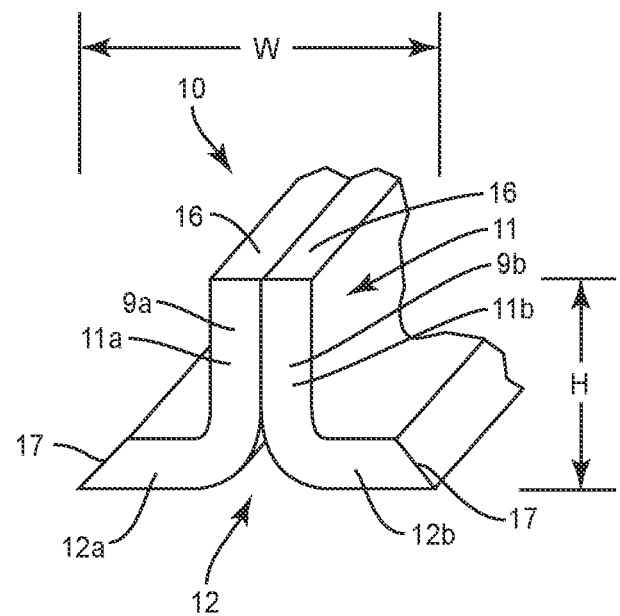
FIG. 1 is a partial perspective end view of a stringer that includes first and second charges.

FIG. 1 illustrates a stringer 10 that is formed by a first charge 9a and a second charge 9b that are positioned in a back-to-back orientation. The first charge 9a includes a blade 11a and a flange 12a. Likewise, the second charge 9b includes a blade 11b and a flange 12b. Each of the charges 9a, 9b includes a first end 16 and an opposing second end 17. The charges 9a, 9b can include the same or different geometries such as shapes and sizes. The charges 9a, 9b can be constructed from the same or different materials. One stringer 10 includes each of the charges 9a, 9b formed from one or more plies of composite material, such as but not limited to carbon fiber reinforced plastic (CFRP), carbon fiber reinforced polymer, carbon fiber reinforced thermoplastic, and fiberglass reinforced plastic (FRP), and other fiber reinforced thermoset or thermoplastic material.

The stringer 10 includes a blade section 11 formed by the blades 11a, 11b and a flange section 12 formed by the flanges 12a, 12b. The flanges 12a, 12b can be aligned at different angles relative to the blades 11a, 11b. In one design as illustrated in FIG. 1, the flanges 12a, 12b are perpendicular to the blades 11a, 11b. A height H measured between an outer side of the flange section 12 and an end of the blade section 11 can vary. A width W measured along the flange section 12 can also vary. The stringer 10 can include different lengths and the thicknesses of the blade sections 11 and flange sections 12 can also vary.

Figure 2:
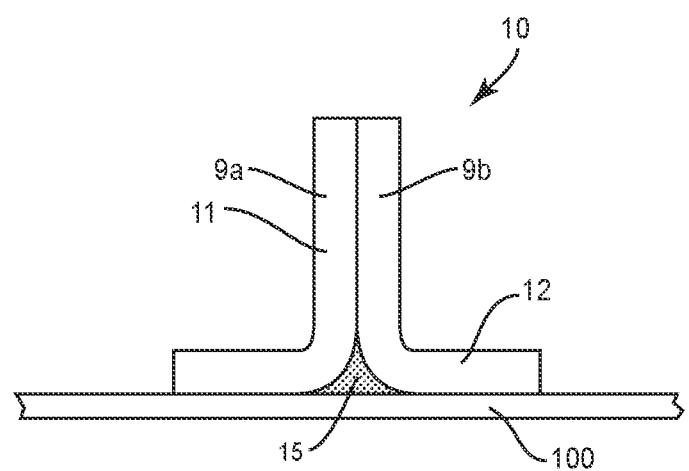
FIG. 2 is an end view of a stringer attached to a panel and with filler material within a groove.

The stringer 10 can be used in a variety of contexts. FIG. 2 includes the stringer 10 connected to a panel 100, such as the wing skin or fuselage of a vehicle. Filler material 15 can be placed in a groove formed between the charges 9a, 9b and the panel 100.

Figure 3:
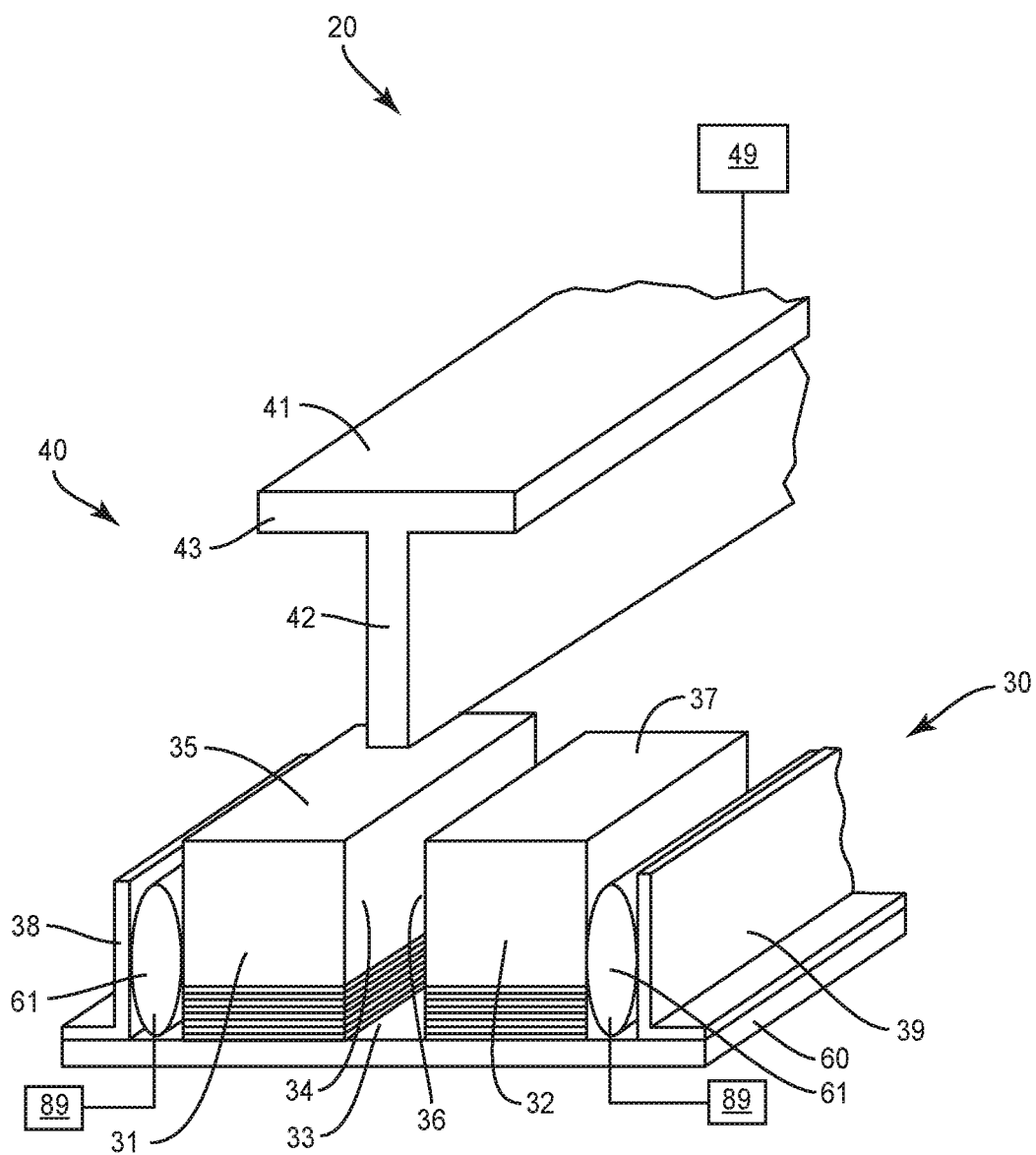
FIG. 3 is a perspective view of a tooling assembly.

FIG. 3 illustrates a tooling assembly 20 employed to form the stringers 10. The tooling assembly 20 generally includes a die assembly 30 and a punch assembly 40.

The die assembly 30 includes a pair of form blocks 31, 32 that are spaced apart to form a die cavity 33. The form blocks 31, 32 can be constructed from relatively rigid material, such as but not limited to wood, metal, ceramic or a composite. The first form block 31 includes an inner surface 34 and an upper surface 35. Likewise, the second form block 32 includes an inner surface 36 and an upper surface 37. The form blocks 31, 32 can include inside radii between the inner surfaces 34, 36 and the upper surfaces 35, 37 that provides for a smooth transition of the charges 9a, 9b between the blade section 11 and the flange section 12.

A pair of L-shape, elongated brackets 38, 39 is mounted on a plate 60 on opposite sides of form blocks 31, 32. The brackets 38, 39 retain the form blocks 31, 32 on the plate 60 as well as react lateral forming forces generated by the form blocks 31, 32. One or more actuators 89 can move the form blocks 31, 32 to adjust a width of the die cavity 33. Inflatable bladders 61 can be positioned between the form blocks 31, 32 and the brackets 38, 39. The bladders 61 can be adjusted in size by the actuators 89 to control the position of the form blocks 31, 32. The bladders 61 can also provide for adjustable pressure to control the movement and forces on the form blocks 31, 32. The forms blocks 31, 32 can also be connected to one or more mechanical devices that move and apply adjustable pressure on the forms blocks 31, 32.

The punch assembly 40 includes a punch die 41. The punch die 41 includes a first section 42 sized to fit within the die cavity 33 and a second section 43 providing the punch die 41 with a sectional shape that resembles the letter T. The transitions between the first section 42 and second section 43 can include various curvatures to form smooth transitions on the stringer 10 between the blade section 11 and the flange section 12. One or more actuators 49 are configured to power the punch die 41 into and out of the die cavity 33.

As will be shown in the following illustrative figures, the charges 9a, 9b are tensioned along their length during the punching process. The amount of tensioning in the different charges 9a, 9b can be the same or different. This allows independent fiber movement within the different charges 9a, 9b and different sections of the stringer 10. This can reduce wrinkles in the charges 9a, 9b during the forming process which could result in disposing of the stringer 10 and/or requiring repair.

Figure 4:
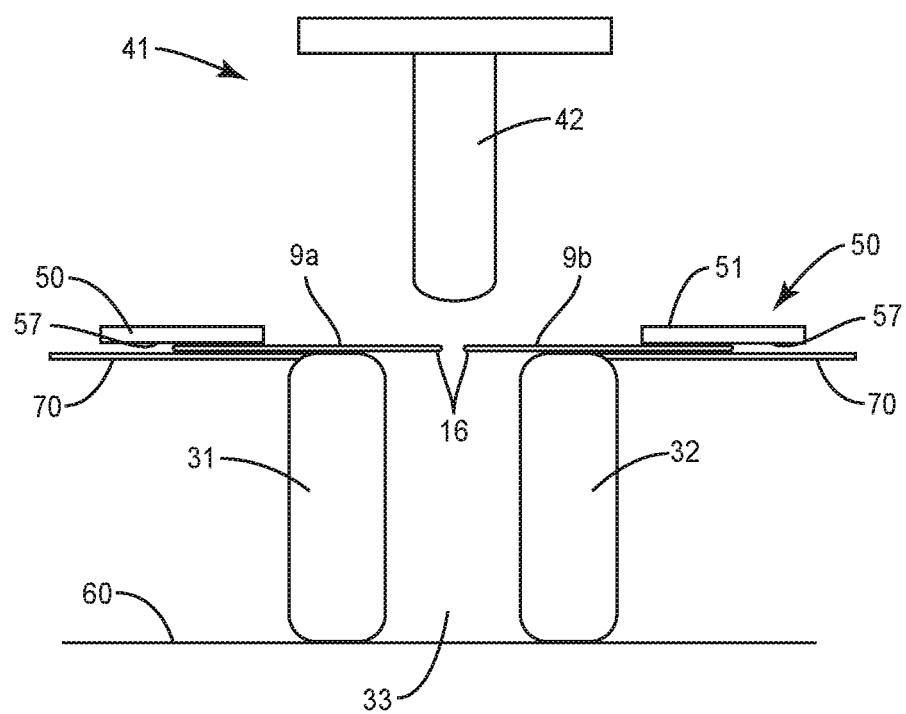
FIGS. 4-11 are schematic illustrations of steps of fabricating a composite blade stringer for a vehicle using the tooling assembly shown in FIG. 3.

FIGS. 4-11 illustrate a method of forming a stringer 10 with separately tensioned charges 9a, 9b. FIG. 4 illustrates the charges 9a, 9b placed over the form blocks 31, 32. A first section of the charges 9a, 9b including the first ends 16 extend over the die cavity 33. A second section of the charges 9a, 9b are positioned over support members 70 that are located in proximity to the form blocks 31, 32.

Figure 5:
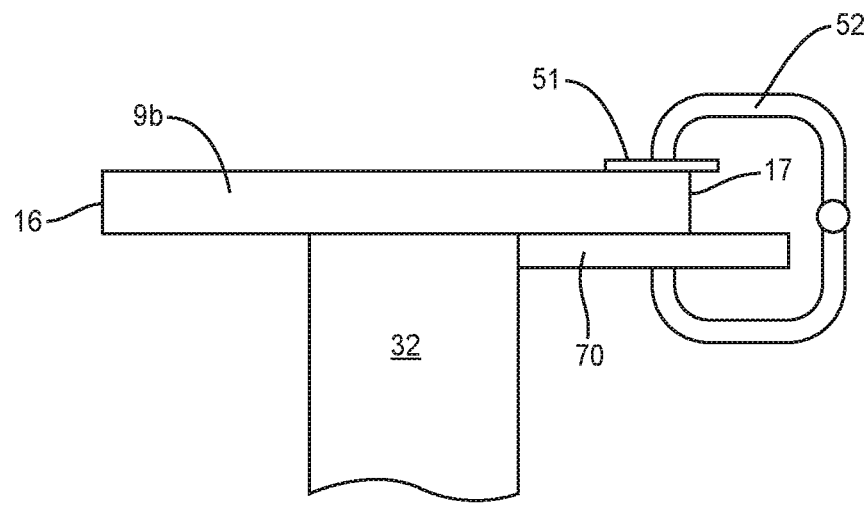

Holding members 50 secure the charges 9a, 9b to the support members 70. FIG. 4 includes the holding members 50 being plates 51 sized and shaped to contact and apply a force to secure the charges 9a, 9b against the support member 70. As illustrated in FIG. 5, the holding member 50 can include a clamp 52 that applies an additional force to secure the plate 51 to the charges 9a, 9b. Mechanical fasteners can also extend between the plate 51 and support member 70 to secure the charges 9a, 9b.

The holding members 50 can also include a grip surface 57 to control movement of the charges 9a, 9b. The grip surface 57 can include surface configurations including but not limited to knurling, etching, and bossing.

Figure 6:
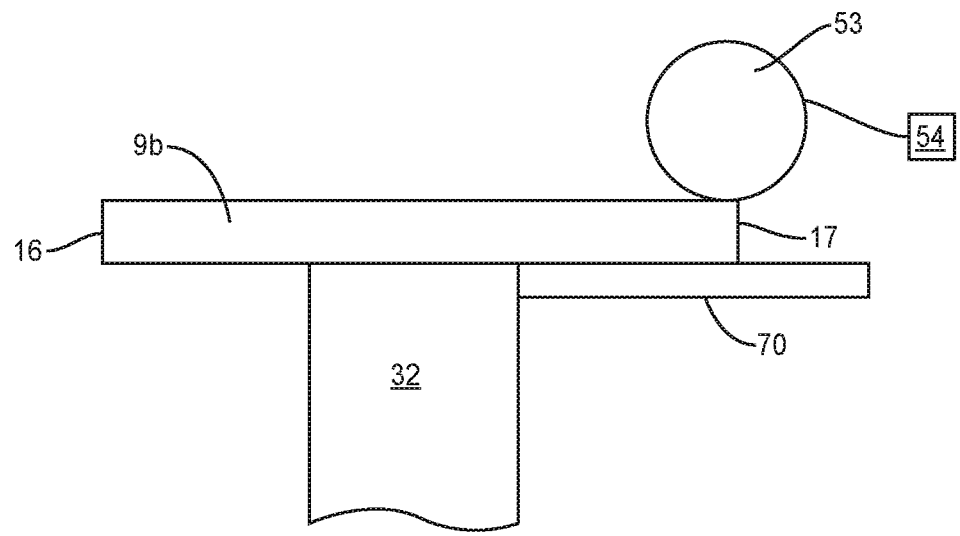

Each of the holding members 50 can also include an inflatable bladder 53 as illustrated in FIG. 6. The bladders 53 are disposed at the support member 70 and can be formed of various suitable materials capable of being pressurized and inflated to the required degree using, for example, pneumatic pressure. The positioning can include being over the support 70 and a second end 17 of the charges 9a, 9b. An actuator 54 can control fluid that is moved to and from a reservoir to inflate and deflate the bladders 53 as necessary to control the pinch force.

The holding members 50 secure the charges 9a, 9b to the support members 70 to allow tensioning of the charges 9a, 9b during the punching process. The holding members 50 contact the charges 9a, 9b at the second ends 17. This provides for the charges 9a, 9b to be tensioned along their lengths measured between the first and second ends 16, 17.

As illustrated in FIG. 4, the charges 9a, 9b extend outward from the form blocks 31, 32 with the first ends 16 positioned over the die cavity 33. The first ends 16 can be spaced apart as illustrated in FIG. 4, in abutting contact with one another, or can overlap. At the start of the process, the punch die 41 can be raised upward away from the charges 9a, 9b.

Figure 7:
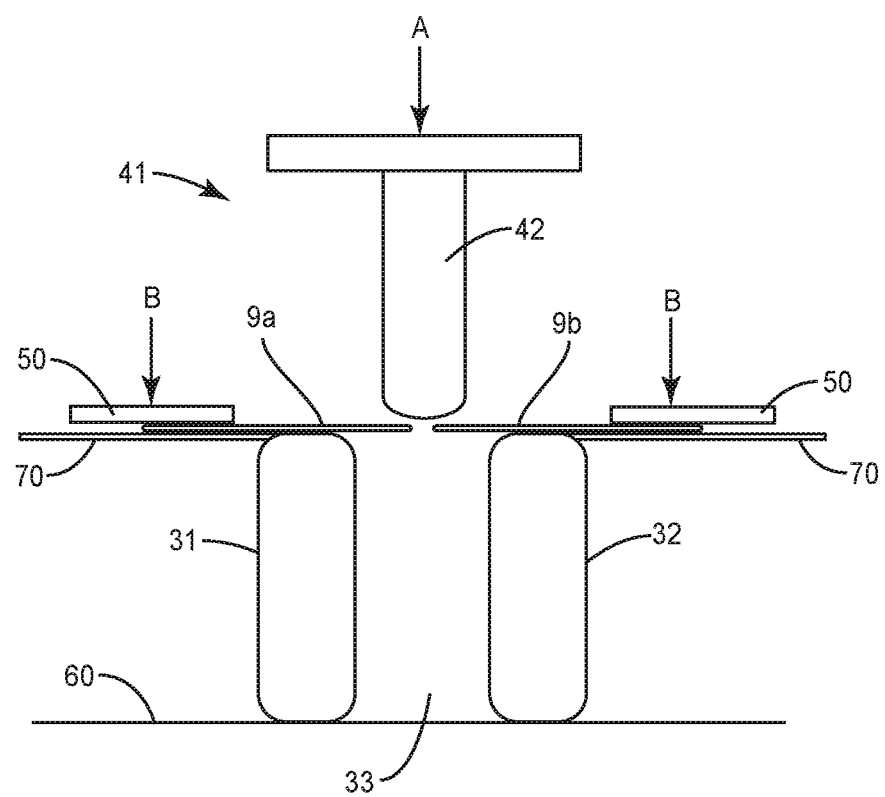

As illustrated in FIG. 7, the holding members 50 apply a force B that secures the charges 9a, 9b against the support members 70. The punch die 41 begins the punching process and is brought downward in the direction of arrow A.

Figure 8:
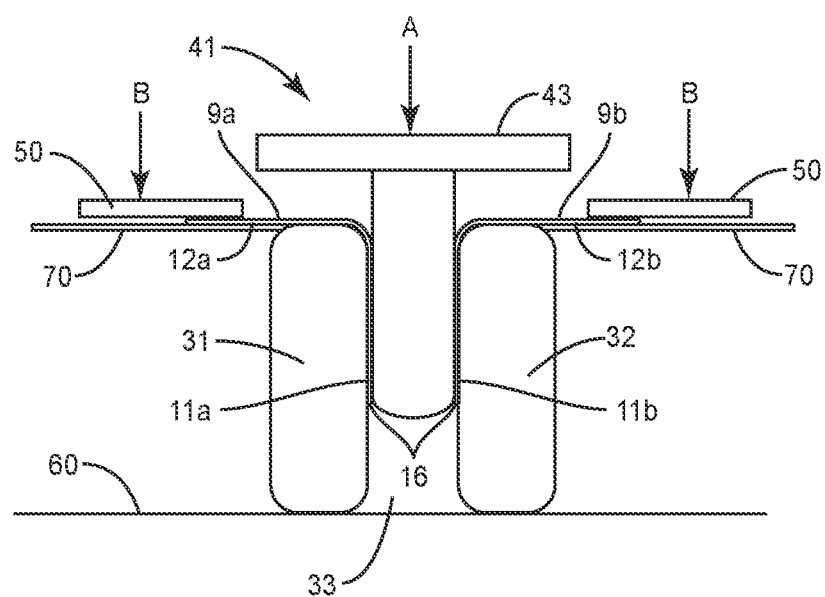

The punching process continues with the punch die 41 moving farther in the direction of arrow A and into the die cavity 33 as illustrated in FIG. 8. This movement forces the first ends 16 and adjacent sections of the charges 9a, 9b into the die cavity 33. The charges 9a, 9b are tensioned during the punching process because the holding members 50 maintain the position of the charges 9a, 9b on the support members 70 as the first ends 16 and adjacent sections are forced into the die cavity 33. As illustrated in FIG. 8, the first sections that are driven into the die cavity 33 form the blades 11a, 11b of each of the charges 9a, 9b. The second sections that remain out of the die cavity 33 form the flanges 12a, 12b.

The punch die 41 can include a surface configured to provide friction to create a tension state within the charges 9a, 9b as the punch 41 is being moved into the die cavity 33. To provide for the tensioning forces on the charges 9a, 9b, the punch die 41 can be constructed from a material or be coated with a material that provides for the tensioning. This can also include surface configurations including but not limited to knurling, etching, and embossing.

Figure 9:
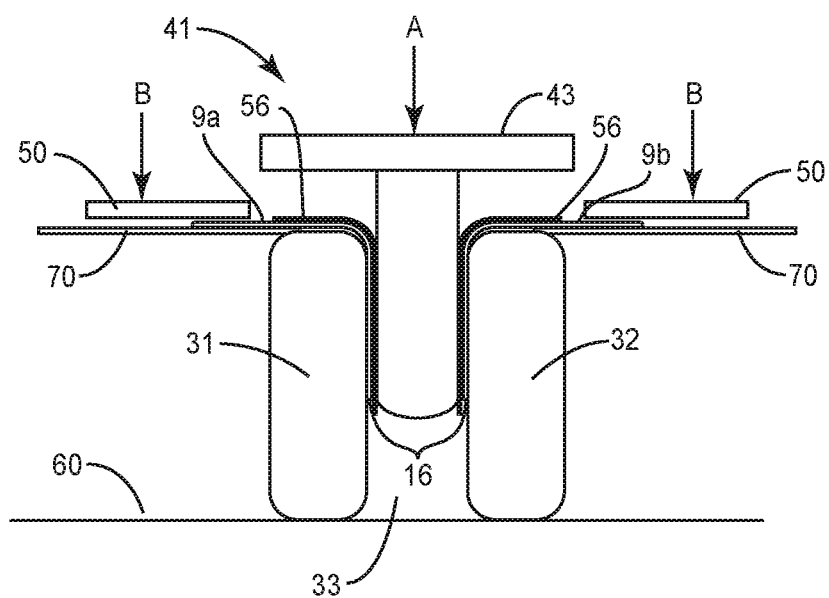

To further facilitate the tensioning of the charges 9a, 9b, release film 56 can be positioned between the punch die 41 and the charges 9a, 9b as illustrated in FIG. 9. The release film 56 can be constructed from material that provides for contact and tensioning with the charges 9a, 9b and prevents adherence of the first and second charges 9a, 9b to the punch die 41. The release film 56 can be constructed from a variety of materials, including but not limited to Teflon. The release film 56 can be sized to extend over the entirety or limited sections of the punch die 41.

During the forming process, the punch die 41 can be inserted various depths into the die cavity 33. This can include the second section 43 contacting against the sections of the charges 9a, 9b that remain out of the die cavity 33. This contact can provide a forming force to shape the flanges 12a, 12b. Other methods can include a lesser amount of insertion into the die cavity 33 with the second section 43 remaining spaced away from the flanges 12a, 12b.

The charges 9a, 9b are independently tensioned during the forming process. This tensioning minimizes wrinkling of the charges 9a, 9b as the charges 9a, 9b can move independently of one another during formation. The individual movement facilitates formation of stringers 10 that are not geometrically symmetric and/or constructed from different materials. The charges 9a, 9b can be individually tensioned to obtain the desired contour of the stringer 10.

Figure 10:
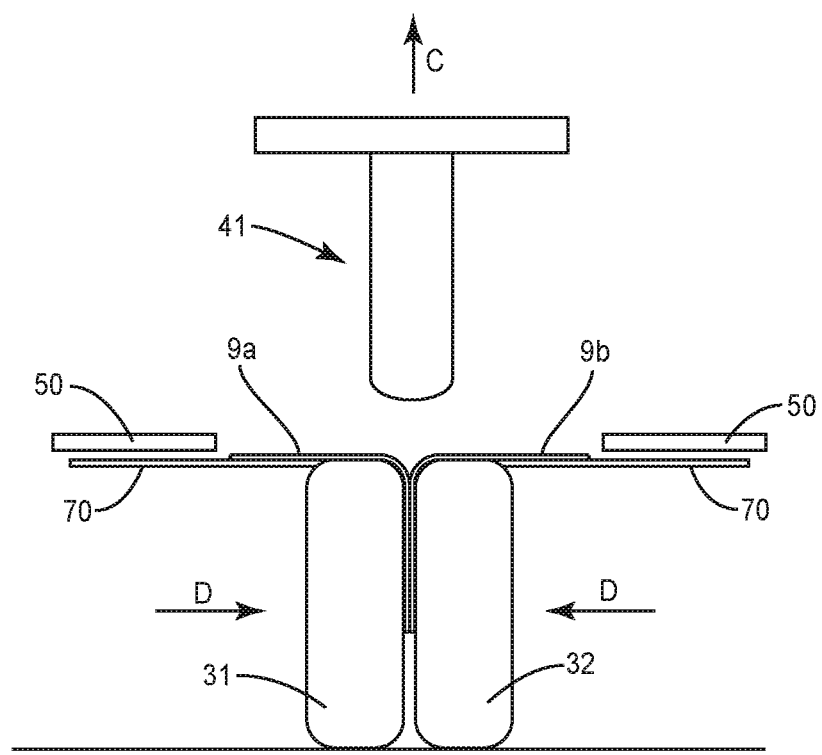

Once the charges 9a, 9b have been formed, the punch die 41 is removed from the die cavity 33. As illustrated in FIG. 10, the punch die 41 is moved in the direction of arrow C away from the die cavity 33 and out of contact with the charges 9a, 9b.

Once the punch die 41 is removed from the die cavity 33, the form blocks 31, 32 are moved inward towards one another in the direction of arrows D. This movement of the form blocks 31, 32 can apply a lateral force and join the blades 11a, 11b together. The holding members 50 can remain in contact with the charges 9a, 9b as the form blocks 31, 32 move towards one another. In one design, the movement of the form blocks 31, 32 pulls the charges 9a, 9b out of contact with the holding members 50. In another design, the holding members 50 remain in contact after the form blocks 31, 32 have completed their inward movement. The holding members 50 can also be removed from the charges 9a, 9b prior to movement of the form blocks 31, 32.

Figure 11:
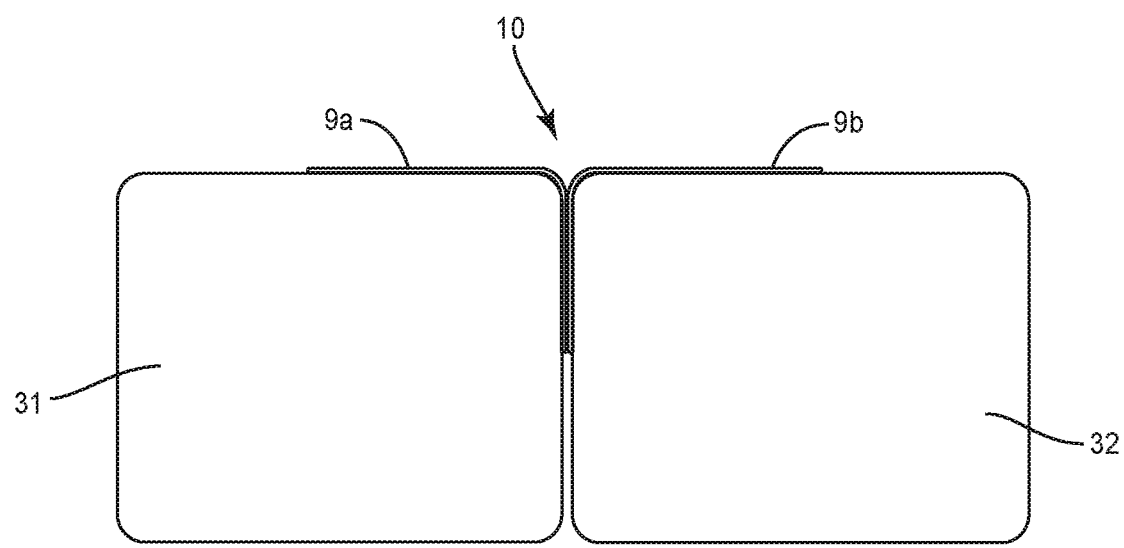
Figure 12:
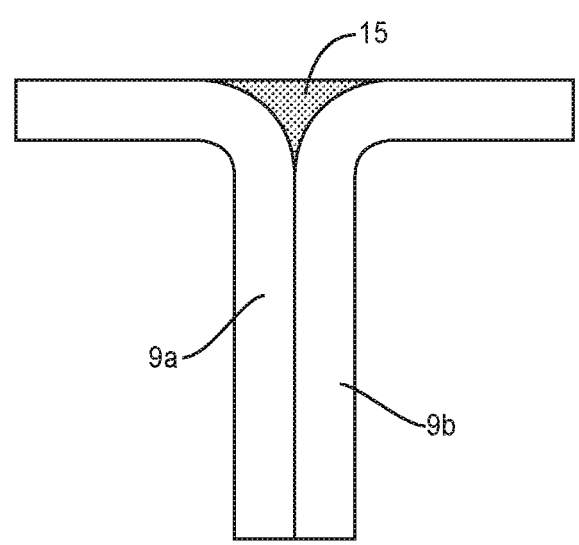
FIG. 12 is an end view of a blade stringer that includes first and second charges and a filler material.

The formed stringer 10 that includes the first and second charges 9a, 9b can then be cured. This can include moving the formed stringer 10 into a cure tool. As illustrated in FIG. 11, the stringer 10 can remain between the form blocks 31, 32 which acts as the cure tool. A composite filler material 15 can be placed into the groove formed between the charges 9a, 9b as illustrated in FIG. 12. The stringer 10 can be installed in a vacuum bag assembly and cured.

Figure 13:
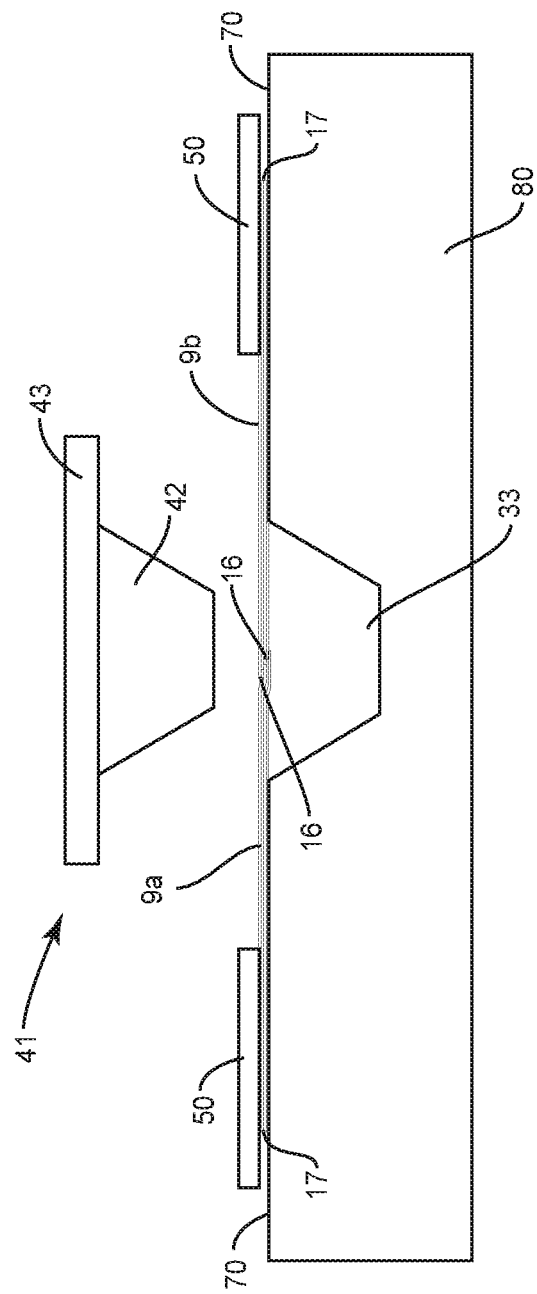

The stringer 10 disclosed above is referred to as a blade stringer 10. The process of tensioning charges 9a, 9b can also be used stringer geometry including but not limited to trapezoidal, hemispherical, and rounded shapes. FIGS. 13 and 14 illustrate fabrication of a hat stringer 10. As illustrated in FIG. 13, the die cavity 33 is formed within a die block 80. The die block 80 includes top surfaces that form support members 70 for the first and second charges 9a, 9b. Holding members 50 are positioned at each of the support members 70 to secure the second ends 17 of the charges 9a, 9b.

The charges 9a, 9b are each positioned on the support members 70 with a first section that extends outward and over the die cavity 33. The charges 9a, 9b are positioned in an overlapping orientation over the die cavity 33 with one of the charges 9a, 9b extending over the other. The overlap prior to forming allows for sufficient length of charge 9a and 9b to completely form the hat stringer. As will be described in detail below, the overlap will be eliminated and form a joint between the charges 9a, 9b when forming is complete. FIG. 13 includes the specific orientation of the first charge 9a positioned over the second charge 9b.

The punch die 41 is shaped to conform to the shape of the die cavity 33. As illustrated in FIG. 14, the punch die 41 is lowered into the die cavity 33 with the first section 42 of the punch die 41 contacting against and driving the charges 9a, 9b into the die cavity 33. While the charges 9a, 9b are being formed into the die cavity 33, the holding members 50 secure the second sections of the charges 9a, 9b to the support members 70. This results in the charges 9a, 9b being tensioned along their lengths. The punch die 41 can extend into the die cavity 33 an amount for the second section 43 to contact against and charges 9a, 9b over to be spaced away from the charges 9a, 9b as illustrated in FIG. 14.

Once the forming is complete, the punch die 41 is moved away from the die cavity 33. The holding members 50 are released from the flanges 12a, 12b and the formed stringer 10 can be removed from the die body 80.

A scarf joint 19 can be formed between the charges 9a, 9b as illustrated in FIG. 15. Each of the charges 9a, 9b is a laminate with multiple plies and having ply drops with offsetting tapers at the first ends 16. These first ends 16 are mated together during the forming process. Various other joints can also be formed with the overlapping configuration, including but not limited to an overlap joint and a butt joint. The charges 9a, 9b can then be cured either while within the die cavity 33 or after removal from the die cavity 33.

Figure 16:
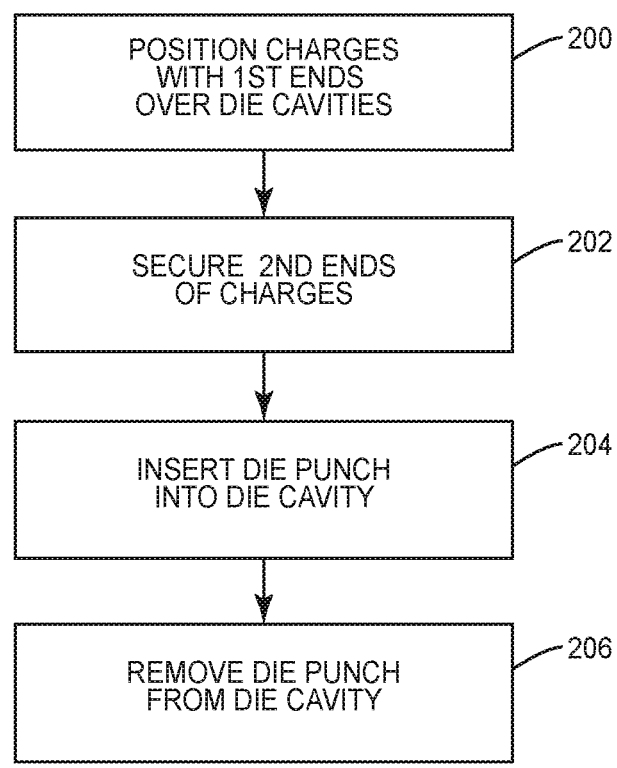
FIG. 16 is a flowchart diagram of a method of forming a stringer.

FIG. 16 includes a flowchart of the steps of fabricating a stringer 10. The process includes positioning first and second charges 9a, 9b with first ends 16 extending over the die cavity 33 (block 200). This can include positioning the charges over a die cavity 33 formed between first and second form blocks 31, 32, or over a die cavity formed in a die body 80. The second ends 17 of the first and second charges 9a, 9b are secured (block 202). The second ends 17 are positioned away from the die cavity 33. A punch die 41 is inserted into the die cavity 33 (block 204). The punch die 41 drives the first ends 16 of the first and second charges 9a, 9b into the die cavity 33 while the second ends 17 remain secured away from the die cavity 33. Moving the punch die 41 and securing of the second ends 17 tensions the charges 9a, 9b along their length between the first and second ends 16, 17. The punch die 41 can then be removed from the die cavity 33 (block 206).

The charges 9a, 9b are tensioned along their lengths. The amount of tensioning of each of the charges 9a, 9b can be the same or can be different. With similar charges 9a, 9b having the same construction and geometry, the tensioning can be equal. Differences in tensioning can be caused by charges 9a, 9b with different constructions and/or different geometries such as thickness. Different tensioning can also be caused by the contour of the stringer 10.

Figure 17:
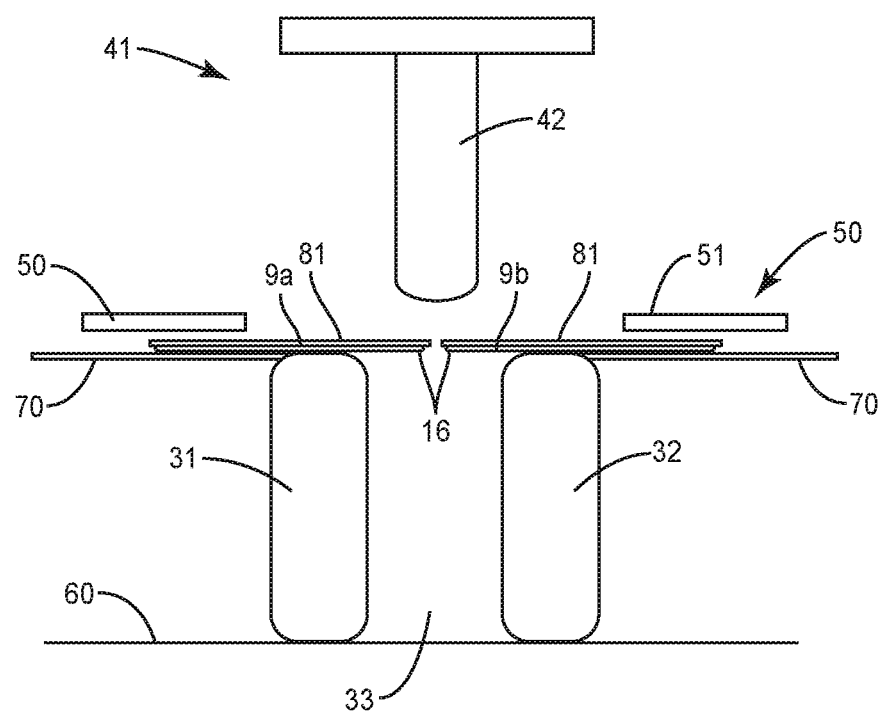
FIG. 17 is a schematic illustration of heating blankets positions on first and second charges.

Prior to inserting the punch die 41, the charges 9a, 9b can be heated. This can include positioning a heating blanket 81 loaded onto the charges 9a, 9b as illustrated in FIG. 17. The heating blanket 81 heats the charges 9a, 9b which can soften the charge thermoset or the thermoplastic resin which can facilitate forming the charges 9a, 9b. Other heating methods include exposure to radiant or inductive type heaters. Heating can increase the tensioning state with the punch die 41.

Figure 18:
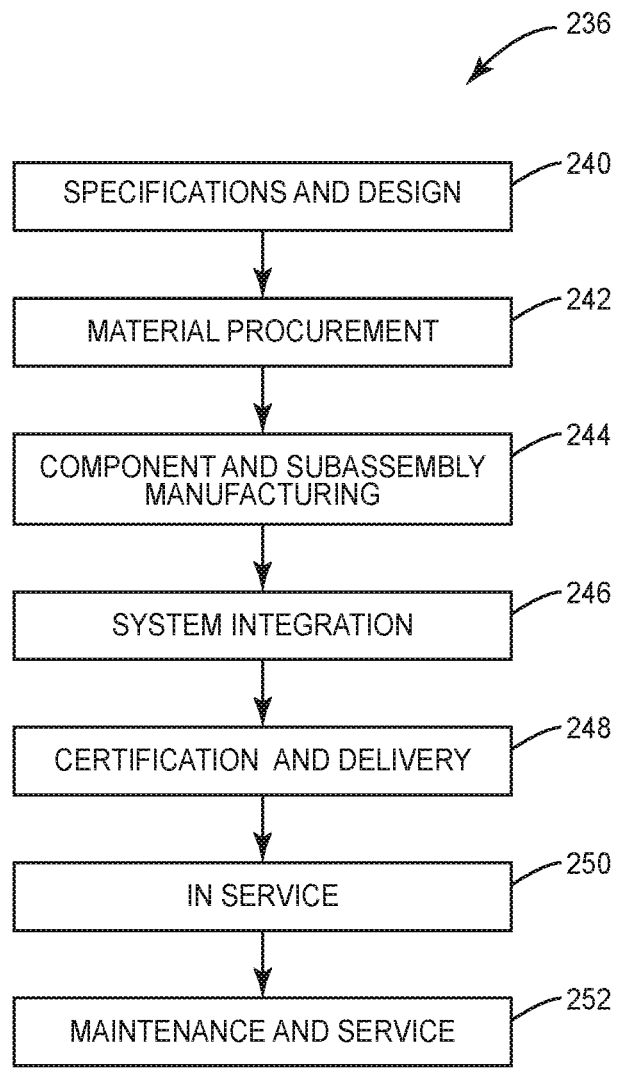
FIG. 18 is a flow diagram of a vehicle production and service methodology.
Figure 19:
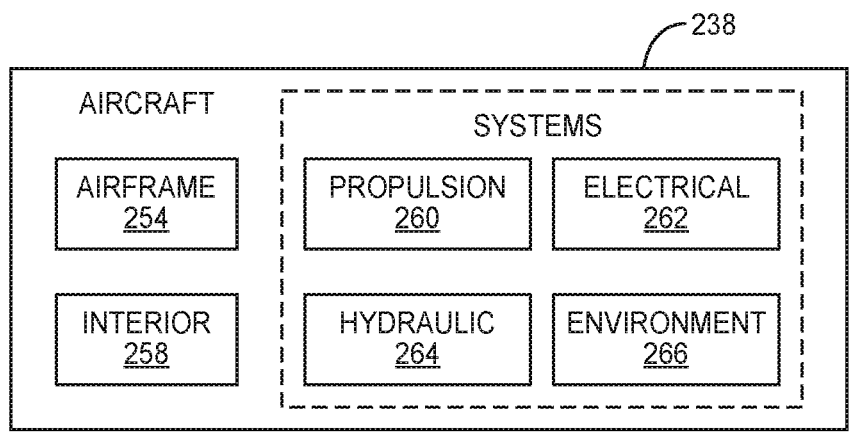
FIG. 19 is a block diagram of a vehicle.

The stringers 10 and fabrication methodologies can being used in a variety of potential applications, particularly in the transportation industry, including for example, aerospace, marine, automotive applications and other application where automated layup equipment can be used. The stringers 10 and methodologies can be used in the context of an aircraft manufacturing and service method 236 as illustrated in FIG. 18 and a vehicle 238 such as an aircraft as illustrated in FIG. 19. During pre-production, exemplary methods 236 can include specification and design 240 of the vehicle 238 and material procurement 242. During production, component and subassembly manufacturing 244 and system integration 246 of the vehicle 238 takes place. Thereafter, the vehicle 238 can go through certification and delivery 248 in order to be placed in service 250. While in service by a customer, the vehicle 238 is scheduled for routine maintenance and service 250, which can also include modification, reconfiguration, refurbishment, and so on.

The processes of method 236 can be performed or carried out by a system integrator, a third party, and/or an operator (e.g., a customer). For the purposes of this description, a system integrator can include without limitation any number of aircraft manufacturers and major-system subcontractors; a third party can include without limitation any number of vendors, subcontractors, and suppliers; and an operator can be an airline, leasing company, military entity, service organization, and so on.

As shown in FIG. 19, the vehicle 238 such as an aircraft produced by exemplary method 236 can include an airframe 254 with a plurality of systems and an interior 258. Examples of high-level systems include one or more of a propulsion system 260, an electrical system 262, a hydraulic system 264, and an environmental system 266. Any number of other systems can be included. Although an aerospace example is shown, the principles of the disclosure can be applied to other industries, such as the marine and automotive industries.

Systems and methods embodied herein can be employed during any one or more of the stages of the production and service method 236. For example, components or subassemblies corresponding to production process 244 can be fabricated or manufactured in a manner similar to components or subassemblies produced while the aircraft 238 is in service. Also, one or more apparatus embodiments, method embodiments, or a combination thereof can be utilized during the production stages 244 and 246, for example, by substantially expediting assembly of or reducing the cost of an aircraft 238. Similarly, one or more of apparatus embodiments, method embodiments, or a combination thereof can be utilized while the aircraft 238 is in service, for example and without limitation, to maintenance and service 252.

The stringer 10 can be used to support different structural elements, including but not limited to a wing, airframe, fuselage, and stiffening panels of a vehicle. The stringer 10 can be used with a variety of vehicles. One vehicle includes a commercial aircraft that includes rows of seats each configured to accommodate a passenger. Other vehicles include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method of fabricating a composite stringer for a vehicle, the method comprising:
positioning first and second charges at a die cavity with first ends of each of the first and second charges extending over the die cavity and with the first and second charges spaced away from a punch die;
securing second ends of each of the first and second charges away from the die cavity;

inserting the punch die into the die cavity and driving the first ends of each of the first and second charges into the die cavity while the second ends remain secured away from the die cavity;

moving the punch die out of the die cavity; and moving together first and second form blocks that form the die cavity and applying lateral force to blades of the first and second charges.

2. The method of claim 1, further comprising releasing the second ends of the first and second charges prior to moving the first and second form blocks together.

3. The method of claim 1, wherein securing the second ends of each of the first and second charges away from the die cavity comprises compressing the second ends between a holding member and a support member.

4. The method of claim 1, further comprising bending the first and second charges into the die cavity and forming blades in the first and second charges.

5. The method of claim 4, further comprising maintaining a section of each of the first and second charges at the second ends on a support member and forming flanges in the first and second charges.

6. The method of claim 1, further comprising tensioning the first and second charges at different tension levels by driving the punch die into the die cavity.

7. The method of claim 1, further comprising overlapping the first ends of the first and second charges over the die cavity prior to inserting the punch die into the die cavity.

8. The method of claim 7, further comprising inserting the punch die into the die cavity and forming a scarf joint at the first ends of the first and second charges.

9. The method of claim 1, further comprising continuing to secure the second ends of the first and second charges while moving the form blocks towards one another.

10. The method of claim 1, further comprising positioning the second ends of the first and second charges under plates and securing the second ends of each of the first and second charges away from the die cavity.

11. The method of claim 1, further comprising inflating bladders that are positioned at the second ends of the first and second charges and securing the second ends of each of the first and second charges away from the die cavity.

12. A method of fabricating a composite stringer for a vehicle, the method comprising:

positioning first and second charges at a die cavity formed between first and second form blocks with a first section including first ends of each of the first and second charges cantilevered over the die cavity and a second section including second ends of each of the first and second charges supported on support members and while a punch die is spaced away from first and second charges;

securing the second sections of the first and second charges to the support members while the punch die is spaced away from the first and second charges;

inserting the punch die into the die cavity and moving the first sections into the die cavity while the second sections remain secured on the support members;

moving the punch die out of the die cavity; and moving together the first sections of the first and second charges.

13. The method of claim 12, further comprising inflating a first bladder and securing the second section of the first charge to one of the support members and inflating a second bladder and securing the second section of the second charge to a second one of the support members.

14. The method of claim 12, further comprising abutting together first ends of the first and second charges over the die cavity prior to inserting the punch die into the die cavity.

15. The method of claim 12, further comprising overlapping first ends of the first and second charges over the die cavity prior to inserting the punch die into the die cavity.

16. The method of claim 15, further comprising forming a scarf joint at the first ends of the first and second charges.

17. The method of claim 12, further comprising releasing the second sections of the first and second charges after inserting the punch die into the die cavity.

18. The method of claim 12, further comprising tensioning an entire length of each of the first and second charges while inserting the punch die into the die cavity and moving the first sections into the die cavity while the second sections remain secured to the support members.

19. A method of fabricating a composite stringer for a vehicle, the method comprising:

positioning first and second charges over a die cavity and away from a punch die;

positioning a first section of the first charge over the die cavity and securing a second section of the first charge to a first support member;

positioning a first section of the second charge over the die cavity and securing a second section of the second charge to a second support member;

moving the punch die against the first and second charges and inserting the punch die into the die cavity and driving the first sections of each of the first and second charges into the die cavity while the second sections remain secured to the first and second support members and tensioning the first and second charges;

moving the punch die out of the die cavity; and moving together first and second form blocks that are positioned on opposing sides of the die cavity and applying a lateral force to the first sections.

20. The method of claim 19, further comprising securing the second sections of the first and second charges while moving together the first and second form blocks.

* * * * *